United States Patent
Forse et al.

[11] 3,720,330
[45] March 13, 1973

[54] VEHICLE LIFTING AND TOWING TRAILER

[75] Inventors: Harry D. Forse, Anderson; Carl C. Butz, Noblesville, both of Ind.

[73] Assignee: Cleanamation, Inc., Anderson, Ind.

[22] Filed: Oct. 6, 1971

[21] Appl. No.: 187,030

[52] U.S. Cl. ..............................214/86 A, 280/402
[51] Int. Cl. ................................................B60p 3/12
[58] Field of Search............................214/86 A, 402

[56] References Cited

UNITED STATES PATENTS

| | | | |
|---|---|---|---|
| 3,283,927 | 11/1966 | Ankeny | 214/86 A |
| 3,627,154 | 12/1971 | Troup | 214/86 A |

*Primary Examiner*—Albert J. Makay
*Attorney*—Harold B. Hood et al.

[57] ABSTRACT

A vehicle lifting and towing trailer having a horizontal main frame with forward and rear ends. A pair of transversely-spaced wheels are pivotally mounted on the main frame adjacent its rear end and a towing hitch is provided adjacent its forward end. A lifting frame is provided having a pair of elongated, transversely-spaced, parallel rails between the wheels and having forward and rear ends, the rails being secured to the main frame adjacent its rear end and being inclined forwardly and upwardly from their rear to their forward ends, and a support structure intermediate the ends of the main frame for supporting the rails adjacent their forward ends. A pair of lifting carriages is slidably mounted on the rails for movement between their ends, and means are provided for removably connecting a part of a vehicle to be lifted and towed to the carriages. A pair of hydraulic rams is provided respectively independently acting upon the carriages for moving the same toward the forward ends of the rails thereby to lift a vehicle, the rams being actuated by a common hydraulic pump thereby equalizing the load on the carriages.

12 Claims, 9 Drawing Figures

INVENTORS:
HARRY D. FORSE,
CARL C. BUTZ,

BY *Wood, Herst, Dush, Lundy & Coffey*
ATTORNEYS.

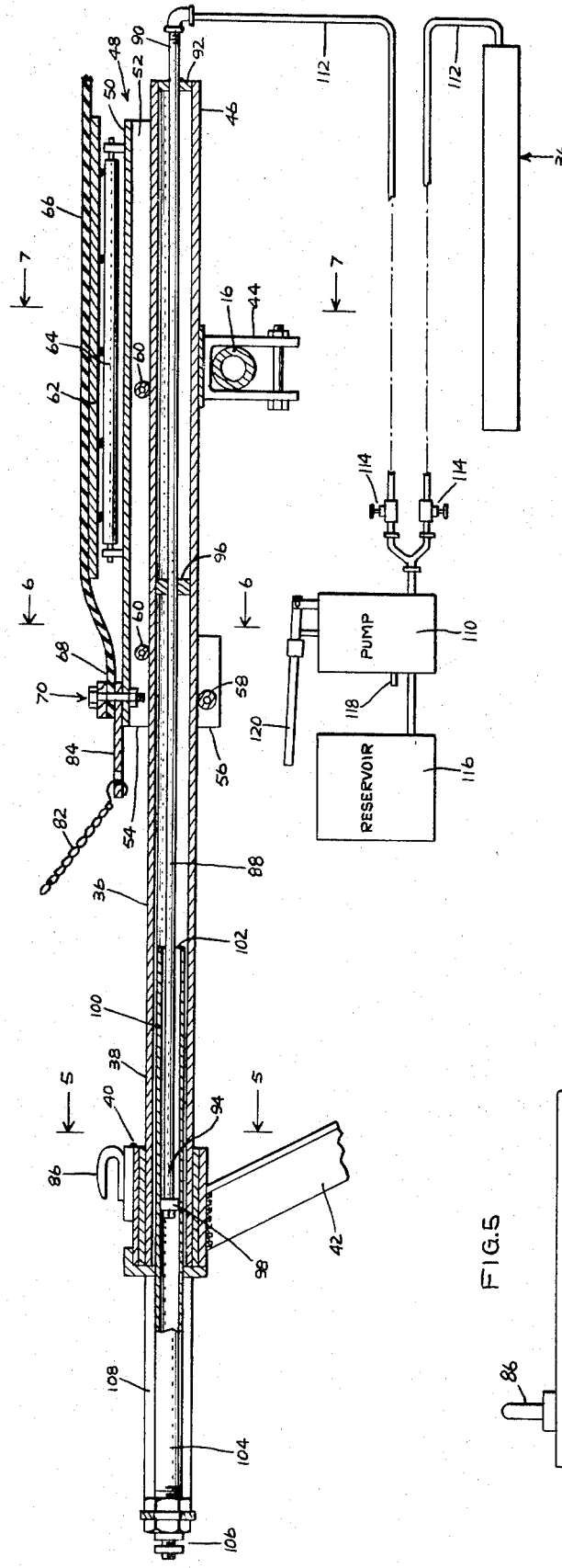
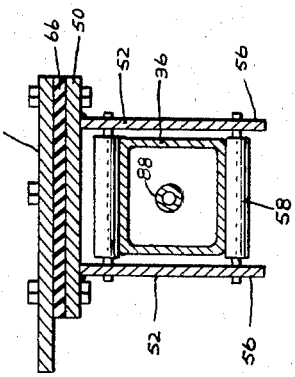
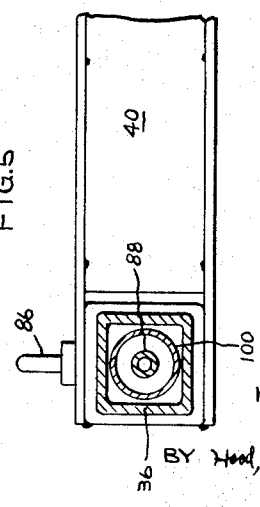

INVENTORS:
HARRY D. FORSE,
CARL C. BUTZ,

ATTORNEYS.

VEHICLE LIFTING AND TOWING TRAILER

BACKGROUND OF THE INVENTION

1. Field of the Invention

This invention relates generally to trailers for lifting and towing a disabled vehicle.

2. Description of the Prior Art

It is frequently desirable to tow a partially disabled automotive vehicle, such as a vehicle having a dead battery, inoperative transmission or a flat tire, to a service facility. Typically, a "wrecker" which comprises a crane and winch apparatus mounted upon a heavy truck and which represents a very substantial investment, is employed for this purpose. While a wrecker may be required for towing badly wrecked vehicles, there are many instances where such a large and costly piece of equipment is not necessary to bring in a vehicle which is merely inoperative or only lightly damaged.

In order to eliminate the need for utilizing a wrecker for towing such partially disabled vehicles, a variety of relatively small, inexpensive trailers have been devised for lifting and towing a vehicle, such trailers being adapted to be towed with a conventional trailer hitch by any vehicle, including a passenger car. Typical of such vehicle lifting and towing trailers are those shown in U.S. Pat. Nos. 3,559,827 and 3,522,892, and a unit referred to as "Tow-A-Way."

SUMMARY OF THE INVENTION

A vehicle lifting and towing trailer including a horizontal main frame having forward and rear ends, a pair of transversely-spaced road-engaging wheels pivotally mounted on the main frame adjacent its rear end, and means on the main frame adjacent its forward end for towing the trailer. A lifting frame is provided comprising a pair of elongated, transversely-spaced, parallel rails between the wheels and having forward and rear ends, the rails being secured to the main frame adjacent its rear end and being inclined forwardly and upwardly from their rear ends to their forward ends, and means on the main frame for supporting the rails adjacent their forward ends. A pair of lifting carriages are slideably mounted on the rails for movement between their ends, and means are provided for removably connecting a part of a vehicle to be lifted and towed to the carriages. Means are provided acting independently on each of the carriages, respectively, for moving the carriages toward the forward ends of the rails thereby to lift the vehicle, the moving means including means for equalizing the load on the carriages.

In one embodiment, the moving and equalizing means comprises a pair of hydraulic rams respectively acting upon the carriages, and a common hydraulic pump coupled to both of the rams. In another embodiment, the moving and equalizing means comprises a block and tackle system including a cable having one end connected to the lifting frame adjacent its forward end, the cable passing over pulleys respectively connected to the carriages and at least one pulley connected to the lifting frame adjacent its forward end, the other end of the cable being connected to a winch.

It is accordingly an object of the invention to provide an improved trailer for lifting and towing disabled vehicles.

Another object of the invention is to provide an improved trailer for lifting and towing disabled vehicles including means for equalizing the load.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

FIG. 4 is a fragmentary side cross-sectional view taken generally along the line 4—4 of FIG. 3, and also schematically showing the hydraulic system;

FIG. 5 is a fragmentary cross-sectional view taken generally along the line 5—5 of FIG. 5;

FIG. 6 is a fragmentary side cross-sectional view taken generally along the line 6—6 of FIG. 4;

DESCRIPTION OF THE PREFERRED EMBODIMENTS

Figure 3:
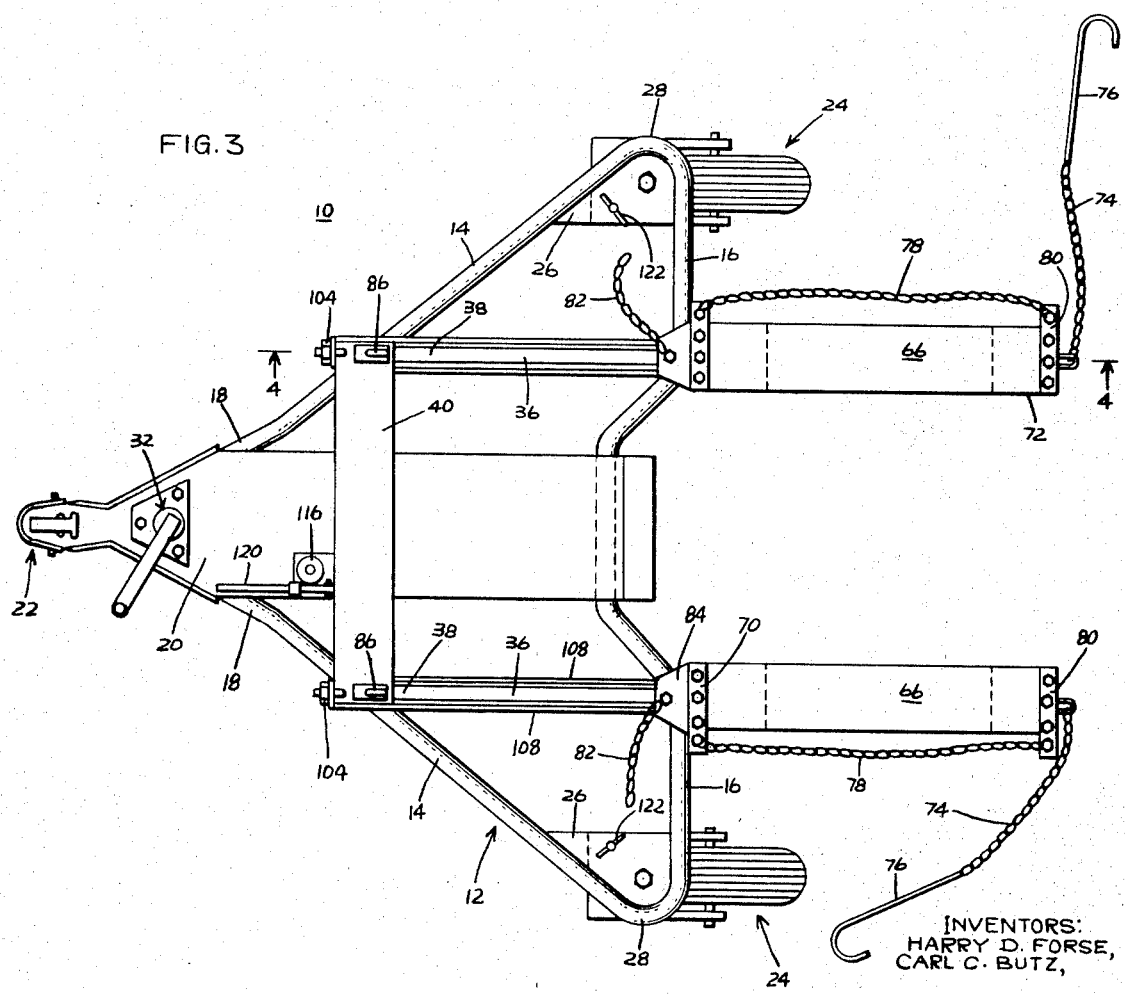
FIG. 3 is a top view of the embodiment of FIGS. 1 and 2.

Referring now to FIGS. 1 through 7 of the drawings, the improved vehicle lifting and towing trailer of the invention, generally indicated at 10, comprises a horizontal, tubular main frame 12 of generally triangular configuration having side elements 14 joined to rear end elements 16, forward ends 18 of side elements 14 being connected by member 20 having conventional trailer hitch 22 thereon. Wheels 24 are pivotally mounted on plates 26 respectively secured to side and rear end frame elements 14, 16 adjacent their apexes 28, as best seen in FIG. 3. Selectively actuable pins 122 are employed for locking wheels 24 in the centered position when desired. A front caster wheel 30 for supporting and manipulating trailer 10 when it is not attached to a towing vehicle by means of hitch 22, is mounted on member 20 and adapted to be raised to an upper position by a conventional jack 32 (FIG. 8) to permit towing the trailer.

Lifting frame 34 is provided comprising a pair of elongated, transversely spaced-apart, parallel rails 36 having their forward ends 38 connected by transverse member 40, and a pair of vertical support members 42 extending between side elements 14 of main frame 12 and member 40. Rails 36 are respectively attached to rear end elements 16 of main frame 12 by brackets 44. Rails 36 are inclined forwardly and upwardly from their rear ends 46 to their front ends 38.

Figure 1:
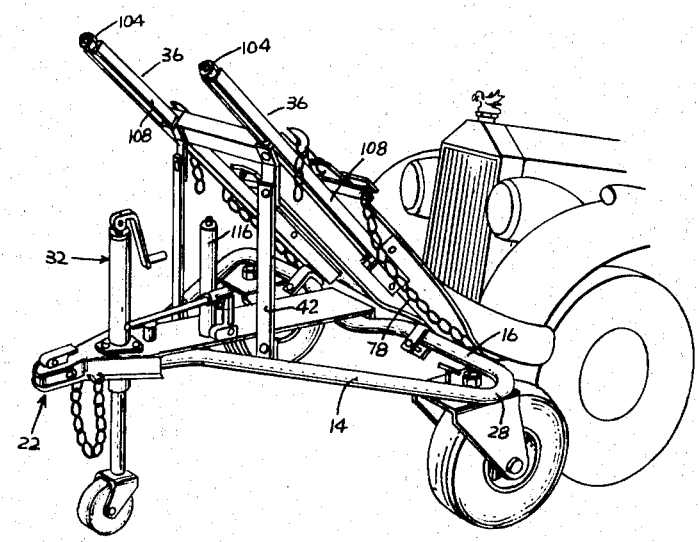
FIG. 1 is a view in perspective showing one embodiment of the invention with a vehicle thereon in towing position.
Figure 2:
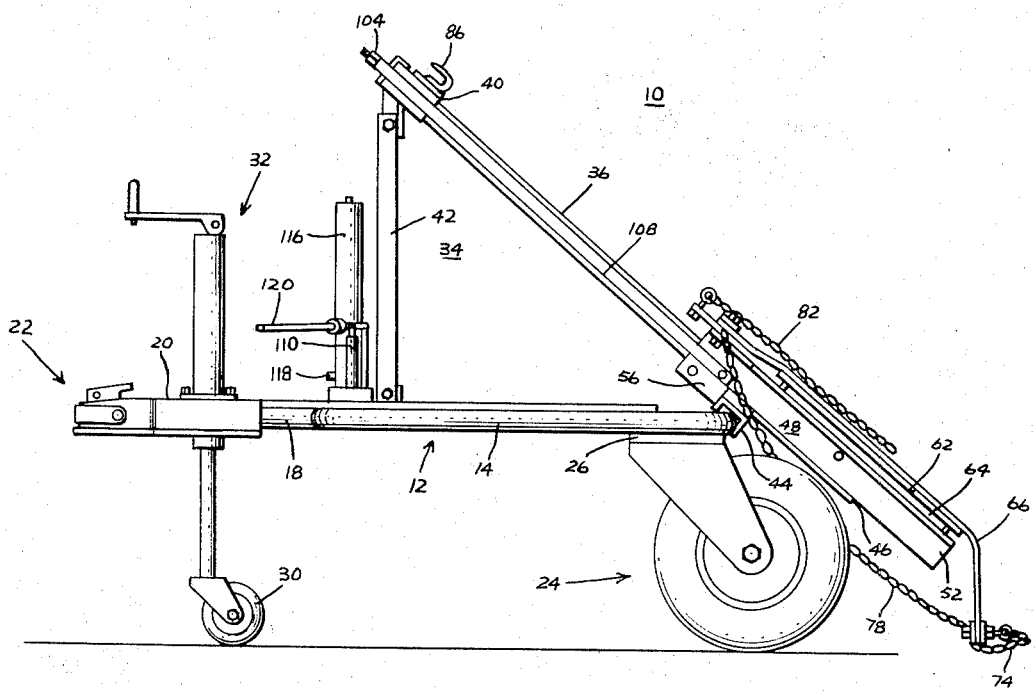
FIG. 2 is a side elevational view of the embodiment of FIG. 1 showing the lifting carriages in their rearward position.
Figure 7:
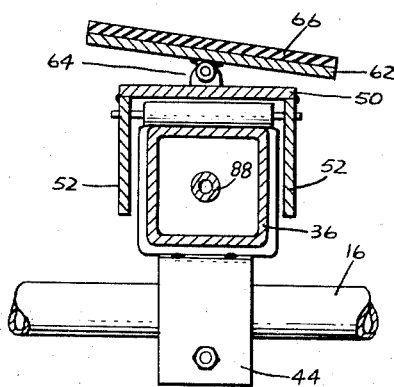
FIG. 7 is a fragmentary side cross-sectional view taken generally along the line 7—7 of FIG. 4.

A pair of carriages 48 are respectively provided slideably mounted on rails 36 for movement between rearward, lower positions, as shown in FIG. 2, and forward, upper positions as shown in FIG. 1. Each of the carriages 48 comprises flat top plate 50 secured to spaced side plates 52 which straddle rail 36 (FIGS. 6 and 7). Forward ends 54 of side plates 52 have a pair of ears 56 depending therefrom, engagement of ears 56 with bracket 44 determining the lower position of carriages 48. Roller 58 extending between ears 56 engages the bottom surface of rail 36 and rollers 60 extending between side plates 52 engage the top surface of rail 36, rollers 58 and 60 guiding carriages 48 for longitudinal movement along rails 36.

Support plates 62 are longitudinally pivotally mounted on top plates 50 by pivot pins 64. Conventional flexible sling belts 66 overlie and engage support plates 62 and have their front ends 68 secured to the front ends of top plates 50 by clamps 70. Rear ends 72 of belts 66 have conventional chains 74 and axle engaging hooks 76 connecting thereto by clamps 80. Safety chains 78 extend between front and rear belt clamps 70, 80 and parallel belts 66 thus guarding against breakage of the belts. Other safety chains 82 are attached to plates 84 secured to the front ends of top plates 50 by front clamps 70. Chains 82 are adapted to be selectively engaged with hooks 86 on member 40 thereby securely to retain carriages 48 in an upper, elevated position (FIG. 1) thereby removing the weight of the lifted and towed vehicle from the carriage lifting mechanism, shortly to be described, during the towing operation.

Rails 36 are in the form of hollow tubes. Each of the rails 36 has an elongated, rigid conduit 88 therein with its rear end 90 extending rearwardly from rear end 46 of tube 36. Rear end 90 of conduit 88 is secured to tube 36 by plate 92, and is supported intermediate its rear and forward ends 90, 94 by plate 96. Piston 98 is attached to forward end 94 of conduit 88. Cylinder 100 has open rear end 102 extending into tube 36 and receives front end 94 of conduit 88 and piston 98, as best seen in FIG. 4. Front end 104 of cylinder 100 is closed by plug 106 and is connected to carriage 48 by links 108 which extend on either side of tube 36. It will thus be seen that introduction of hydraulic fluid under pressure through conduit 88 into the space between piston 98 and closed end 104 of cylinder 100 will result in extension of cylinder 100 with resultant movement of carriage 48 toward end 38 of tube/rail 36.

Referring now particularly to FIG. 4, end 90 of each conduit 88 is coupled to manually actuated pump 110 by hydraulic line 112, each of the hydraulic lines 112 having a manually actuated shut-off valve 114 therein. Hydraulic reservoir 116 is coupled to pump 110. Pump 110 includes a conventional one-way valve (not shown) and a bypass having a valve therein (also not shown) actuated by manually actuated lever 118. Thus, with carriages 48 in their rearward, lowered positions, and with the bypass valve closed by lever 118, manual actuation of pump lever 120 will result in pumping hydraulic fluid under pressure through hydraulic lines 112 and conduits 88 into cylinders 100, resulting in extension of cylinders 100 and movement of carriages 48 upwardly and forwardly along rails/tubes 36. When it is desired to lower carriages 48, lever 118 is actuated to open the bypass valve which permits cylinders 100 to retract and carriages 48 to return to their lowered position, the hydraulic fluid being returned to reservoir 116 through the bypass.

It will now be seen that each of the conduits 88, pistons 98 and cylinders 100 comprises a hydraulic ram acting individually and independently upon the respective carriage 48, the two rams being actuated by common pump 110 thus equalizing the load applied to carriages 48 so as to prevent binding of either carriage.

Referring to FIG. 1, in use, trailer 10 with carriages 48 lowered is backed so that belts 66 and carriages 48 extend under and engage the front or rear bumper of the vehicle to be lifted and towed. Hooks 76 are then engaged with the front or rear axle of the vehicle, as the case may be, and pump 110 is then manually actuated thereby moving carriages 48 and belt 66 upwardly and forwardly applying tension on chains 74 and hooks 76 and lifting the front or rear axle and its wheels off the ground so as to permit towing.

Figure 8:
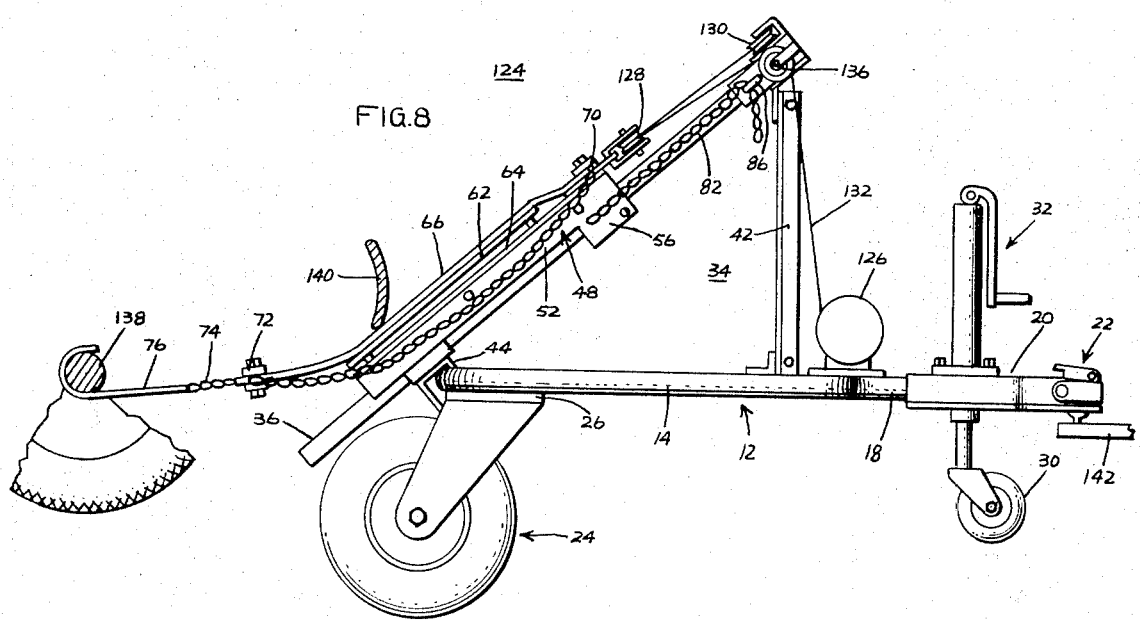
FIG. 8 is a side elevational view, partly in cross-section, showing another embodiment of the invention with a vehicle thereon in towing position.
Figure 9:
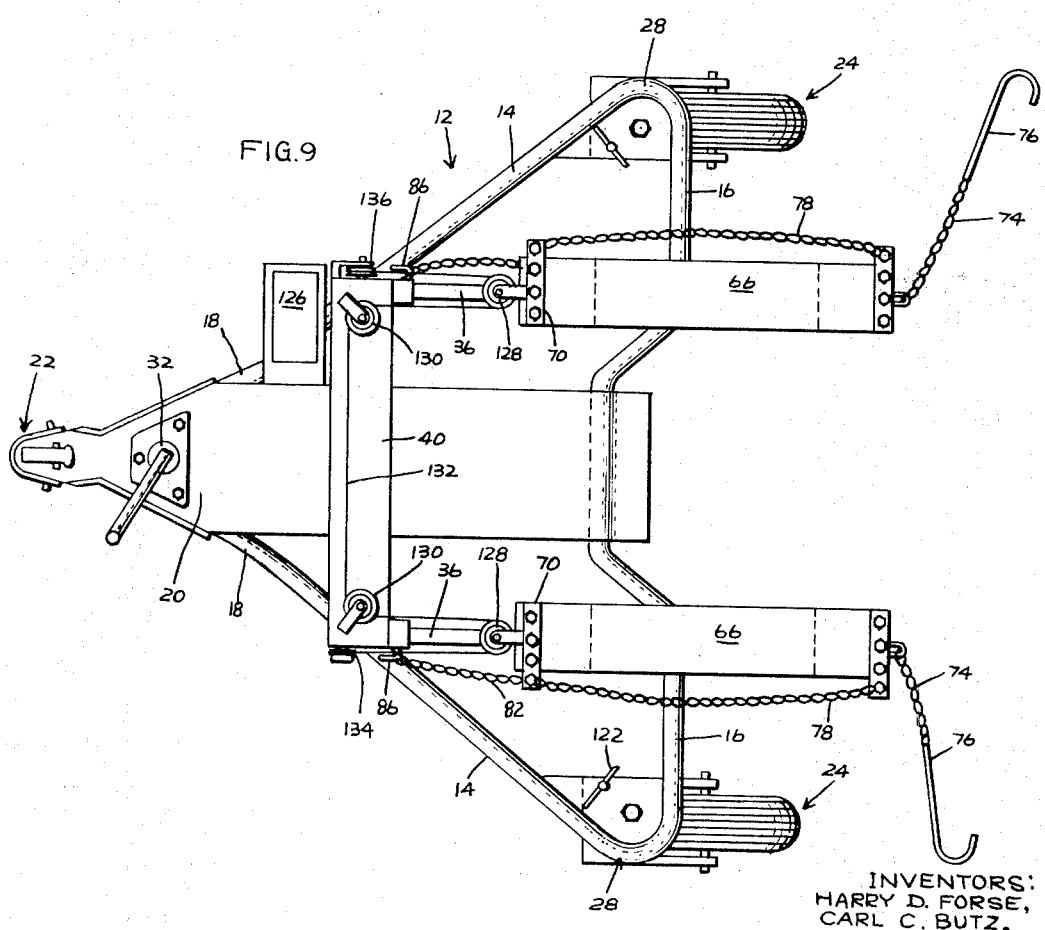
FIG. 9 is a top view of the embodiment of FIG. 8.

Referring now to FIGS. 8 and 9 in which like elements are indicated by like reference numerals, an embodiment of the improved vehicle lifting and towing trailer of the invention, generally indicated at 124, is shown which incorporates an electric winch 126 and a block and tackle system for raising and lowering carriages 48. Here, pulleys 128 are attached to front clamps 70 of carriages 48 and pulleys 130 are attached to member 40 of lift frame assembly 34. Cable 132 has its end 134 attached to one side of member 40, and extends around one pulley 128, both pulleys 130, the other pulley 128, and another pulley 136 on the other side of member 140, the other end of cable 132 being attached to electric winch 126 mounted on main frame 12.

In FIG. 8, chain 74 and hooks 76 are shown attached to axle 138 of a vehicle with bumper 140 resting upon carriages 48 and sling belt 66, and carriages 48 are shown elevated by means of cable 132 and winch 126 with safety chains 82 engaged with hooks 86 respectively secured to the sides of member 40 of lifting frame 34. Trailer hitch 22 is also shown engaged with two bar 142 of a towing vehicle (not shown) and front caster wheel 30 is shown raised to permit towing trailer 124.

It will now be seen that in the embodiment of FIGS. 8 and 9, carriages 48 are again independently and individually acted upon by cable 132, the cable and pulley system again equalizing the load and preventing binding of one or the other of the carriages 48.

While there have been described above the principles of this invention in connection with specific apparatus, it is to be clearly understood that this description is made only by way of example and not as a limitation to the scope of the invention.

What is claimed is:

1. In a vehicle lifting and towing trailer including a horizontal main frame having forward and rear ends, a pair of transversely-spaced road-engaging wheels pivotally mounted on said main frame adjacent said rear end thereof, means on said main frame adjacent said forward end thereof for towing said trailer, a lifting frame comprising a pair of elongated, transversely-spaced, parallel rails between said wheels and having forward and rear ends, said rails being secured to said main frame adjacent said rear end thereof and being inclined forwardly and upwardly from said rear ends to said forward ends, means on said main frame thereof for supporting said rails adjacent said forward ends thereof, a pair of lifting carriages slideably mounted on said rails for movement between said ends thereof, and means for removably connecting a part of a vehicle to be lifted and towed to said carriages; the improvement comprising means acting independently on each of said carriages, respectively, for moving the same toward said forward ends of said rails thereby to lift a vehicle and including means for equalizing the load on said carriages, said moving and equalizing means comprising a pair of hydraulic rams respectively acting upon said carriage, and a common hydraulic pump coupled to both of said rams, each of said rails being a hollow member having the respective ram therein.

2. The trailer of claim 1 wherein each of said rams comprises an elongated, rigid conduit having forward and rear ends and being secured adjacent its rear end to the respective member adjacent its rear end, a piston secured to said conduit at its forward end, a cylinder having an open rear end and closed forward end and having said forward end of said conduit and piston therein, said forward end of said cylinder extending out of the forward end of the respective member, means for connecting the forward end of said cylinder to the respective carriage for moving the same in response to extension and retraction of said cylinder, and a hydraulic line coupling said rear end of said conduit to said pump.

3. The trailer of claim 2 wherein said last-named connecting means comprises a pair of links on opposite sides of the respective member.

4. The trailer of claim 2 further comprising a selectively actuable shut-off valve in each of said hydraulic lines.

5. The trailer of claim 2 further comprising a support member longitudinally pivotally mounted on each of said carriages for conforming to the shape of a vehicle bumper engaged thereby.

6. The trailer of claim 5 further comprising a pair of safety chains respectively connected to said carriages, and means on said lifting frame adjacent said forward end thereof for respectively removably attaching said chains thereby to retain said carriages in an elevated position for towing a vehicle.

7. The trailer of claim 1 further comprising a support member longitudinally pivotally mounted on each of said carriages for conforming to the shape of a vehicle bumper engaged thereby.

8. The trailer of claim 7 wherein said connecting means includes a pair of elongated, flexible belts respectively attached to said carriages and overlying said support members.

9. The trailer of claim 1 further comprising a pair of safety chains respectively connected to said carriages, and means on said lifting frame adjacent said forward end thereof for respectively removably attaching said chains thereby to retain said carriages in an elevated position for towing a vehicle.

10. In a vehicle lifting and towing trailer including a horizontal main frame having forward and rear ends, a pair of transversely-spaced road-engaging wheels pivotally mounted on said main frame adjacent said rear end thereof, means on said main frame adjacent said forward end thereof for towing said trailer, a lifting frame comprising a pair of elongated, transversely-spaced, parallel rails between said wheels and having forward and rear ends, said rails being secured to said main frame adjacent said rear end thereof and being inclined forwardly and upwardly from said rear ends to said forward ends, means on said main frame thereof for supporting said rails adjacent said forward ends thereof, a pair of lifting carriages slideably mounted on said rails for movement between said ends thereof, and means for removably connecting a part of a vehicle to be lifted and towed to said carriages; the improvement comprising means acting independently on each of said carriages, respectively, for moving the same toward said forward ends of said rails thereby to lift a vehicle and including means for equalizing the load on said carriages, said equalizing means comprising a cable having one end connected to said lifting frame adjacent said forward end thereof, said cable passing over pulleys respectively connected to said carriages and at least one pulley connected to said lifting frame adjacent said forward end thereof, the other end of said cable being connected to a winch.

11. The trailer of claim 10 further comprising a support member longitudinally pivotally mounted on each of said carriages for conforming to the shape of a vehicle bumper engaged thereby.

12. The trailer of claim 11 further comprising a pair of safety chains respectively connected to said carriages, and means on said lifting frame adjacent said forward end thereof for respectively removably attaching said chains thereby to retain said carriages in an elevated position for towing a vehicle.

* * * * *